June 13, 1961 H. H. NOCKE 2,987,882
ROCKET ENGINE STRUCTURE
Filed June 30, 1958
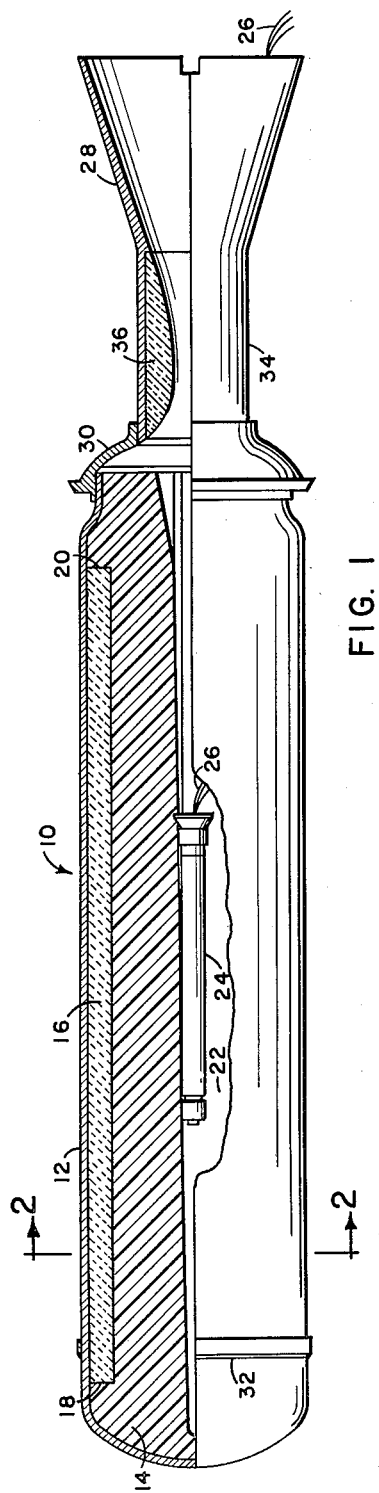
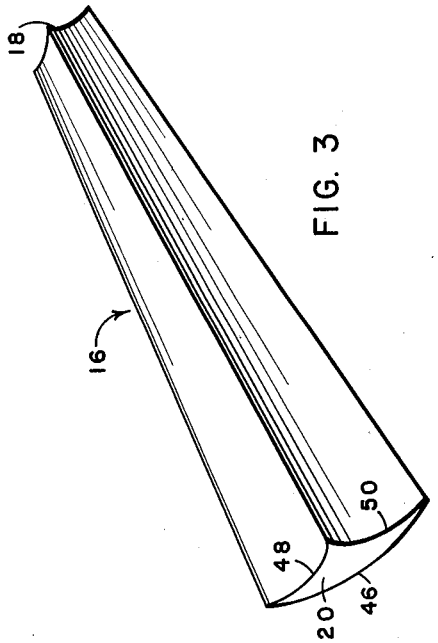
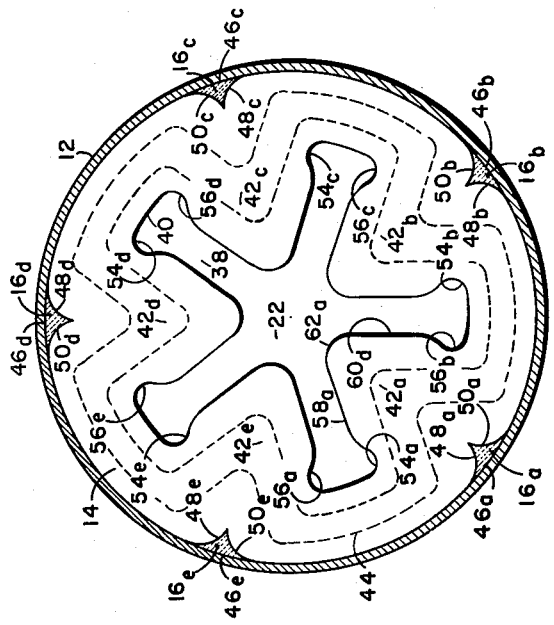
*INVENTOR.*
HENRY H. NOCKE
BY *Gordon K. Lester*

United States Patent Office 2,987,882
Patented June 13, 1961

---

2,987,882
ROCKET ENGINE STRUCTURE
Henry H. Nocke, Huntsville, Ala., assignor to Thiokol Chemical Corporation, Trenton, N.J., a corporation of Delaware
Filed June 30, 1958, Ser. No. 745,769
7 Claims. (Cl. 60—35.6)

This invention relates to solid-propellant rocket engines and more particularly to a device for rapid termination of the burning of the propellant contained therein.

In solid-propellant rocket engines, the configuration of the propellant, which is commonly bonded directly to the casing by casting a fluid propellant mixture in the casing and curing in situ, is often such that the propellant burns from the inside outward. The propellant commonly comprises a mixture of an organic polymer binder, such as a Thiokol polysulfide, polyurethane resin, or polybutadiene acrylic acid copolymer, and an inorganic oxidizing agent, such as ammonium perchlorate or ammonium nitrate. The propellant often projects from the casing toward the axis of the generally cylindrical-shaped engine in a plurality of extensions, often called star-points, the shape of which varies all the way from notched or pointed to having approximately parallel faces at their circumferential web origin or converging toward either end, depending upon the thrust-versus-time program desired, viz., whether level, progressive, regressive, or multi-level burning of the propellant is desired. Regardless of the shape of the star-points, however, when the peripheral band of propellant adjacent to the interior wall of the cylinder and between the bases of the star-points ordinarily called the web has burned through completely, small portions of the star-points of propellant next to the casing, generally called slivers, are left still to be burned. This results in a gradual decrease in thrust as these slivers slowly burn out, in contrast to the immediate burnout desired. Thrust is the motive force caused by the emission through the rocket engine nozzle or nozzles of gases resulting from burning of the propellant. Rapid burnout or sharp cutoff or tail-off is essential for achieving prompt detachment of one stage from the remainder of a staged rocket.

It is accordingly an object of this invention to provide a device for rapid termination of propellant burning in an internal-burning solid-propellant rocket engine, the propellant grain of which has an internal star-shaped configuration. Another object of this invention is to provide inert material to fill the curved triangular spaces commonly remaining after burnthrough of a propellant grain of the type referred to above. Still another object is to provide structural reinforcing means for use in low-pressure, thin-walled rocket engine casings.

In accordance with the present invention, the space ordinarily occupied by unburned slivers of propellant at the time of web burnout for an internal-burning star propellant configuration is filled with inert slivers. When weight of components is a limiting factor in designing the engine, the slivers may be made of a substance of lower apparent density than that of the propellant. Apparent density is the over-all weight divided by the over-all volume. When structural strength is of primary importance, the slivers may be of a substance of high tensile strength for an additional stiffening effect. In normal burning of an internal-burning star configuration, the size of the central axial cavity gradually increases as the propellant burns from the inside outward toward the cylindrical casing. As burning continues, the radial extensions of the central cavity or spaces between the propellant star-points gradually enlarge like growing mushrooms, both the stalks and the heads of which expand, until all of the propellant is consumed. According to my invention, the remaining curved triangular spaces of the star-points at the rocket engine casing ordinarily occupied by propellant which would continue to burn after complete burnthrough of the portion of the web included between the bases of the star-points are completely occupied by slivers of some inert or non-burning substance. The slivers may be hollow. The material used may be wood, aluminum, or steel alloy of possible honeycomb sandwich or other hollow construction, filled or unfilled phenolic resin, polyurethane resin, or other suitable substance. In order to prevent sufficient burning to cause continued thrust from occurring after web burn-through, the substance must not contain an oxidizer. The slivers may be attached to the rocket engine casing by bonding directly to the casing or indirectly through a rubber-like adhesive material to help take up the differential coefficient of thermal expansion, that is, to provide a good bond under varying temperatures. Attachment may also be provided by mechanical means, such as screws or clips, through the casing. The height of the propellant star-points may be tapered from front to rear of the engine to provide a cavity with greater cross section at the rear (nozzle) end of the casing, where mass flow of gas is greater, and in such instances, the height of the slivers is tapered correspondingly to conform to the burning surface at the time of web burnthrough. Portions of or all of the individual inert slivers may be omitted for thrust-time control.

A feature of this invention is the sharp tail-off or burnout secured in a solid-propellant rocket engine of this construction. Another feature is the structural stiffening of a thin-wall rocket engine, the imparting of the ability to withstand longitudinal bending moments encountered in high velocity and extremely variable maneuver conditions.

The present invention may best be understood and appreciated by referring to the accompanying drawing, which illustrates a rocket engine having a thrust-terminating device incorporating a preferred embodiment of the invention.

In the drawing:
FIGURE 1 is a partially cut-away longitudinal view of a solid-propellant rocket engine incorporating a preferred embodiment of this invention.

FIGURE 2 is a greatly enlarged cross section of the solid-propellant rocket engine of FIGURE 1 taken at line 2—2.

FIGURE 3 is a perspective view of an inert sliver of the type shown in longitudinal cross section in the solid-propellant rocket engine of FIGURE 1.

Referring to the drawing, and more particularly to FIGURE 1, the rocket engine 10 there shown comprises a generally cylindrical steel casing 12 having a body of solid propellant 14 cast therein and bonded thereto. Along the length of said rocket engine casing 12 are bonded thereto a plurality of inert slivers 16. These slivers 16, which terminate lengthwise at the forward and rear ends of the cylindrical casing 12 at faces 18, 20 perpendicular to said casing 12 as indicated more clearly in the cross section of FIGURE 2, fill only the curved triangular portions next to the casing ordinarily left after all surfaces of the propellant configuration, commonly called grain, have burned through evenly, as indicated by the dotted lines showing the gradually receding surfaces as burning of propellant continues. Said slivers 16 may extend to any desired point along the forward-end or rear-end curvature of the rocket engine casing 12. The end surfaces of the slivers 16 may be determintd by the curvature of the rocket engine, the inner concave surfaces being thus extended to meet the casing. The ends of the rocket engine 10 may be of any desired shape, but are usually hemispherical or ellipsoidal. Within a central passage 22 that extends through the center of the rocket engine 10, there is an electrically actuated igniter 24. Actuation of the igniter 24 is effected through electrical leads 26 that extend rearward through the rocket engine 10 by way of a nozzle 28, which is threaded to a flanged adapter 30 joined to the rear part of the rocket engine casing 12. An annular ring 32 surrounds the head-end portion of the cylindrical casing 12 to provide a means of attachement of the rocket engine 10 to a warhead or guidance system. The throat 34 of the nozzle 28 is defined by the insert 36 of carbon or other erosion-resistant substance. Expulsion through the nozzle 28 of hot exhaust gases resulting from the burning of the solid propellant 14 causes propulsion of the rocket engine 10.

Referring now to FIGURE 2, the propellant grain 14 is internally recessed to form the central passage 22 and a series of radial grooves 38 that have enlarged outer ends 40 and extend lengthwise through the propellant grain 14. The portions of the propellant grain 14 between the grooves 38 form extensions toward the axis called ordinarily star-points 42a to 42e which at their bases merge into a peripheral web 44 that is bonded along most of its surface to the casing 12. At the centers of the bases of the star-points 42a through 42e there are bonded to portions 46a through 46e of the concave surface of the casing 12 a plurality of inert slivers 16a through 16e of oxidizer-free material. The internally extending concave faces 48a, 50a of the sliver at the base of star-point 42a are defined by opposing convex propellant surfaces bonded thereto. At the centers of the bases of the star-points 42b through 42e are likewise defined similar faces 48b and 50b through 48e and 50e. These faces 48a and 50b through 48e and 50e, together with the remaining peripheral surfaces of the propellant 14 along the casing 12 opposite the radial grooves 38, include the final burning surface of the propellant after the web had burned through completely. It will be evident that the slivers 16, which may be comprised of wood, aluminum, phenolic resin, polyurethane foam, or other appropriate apparent low density composition containing no oxidizer, cause immediate termination of burning of the propellant, which ordinarily contains an organic polymer and an inorganic oxidizing agent, when the propellant has burned through, forming in succession the parallel surfaces indicated by the dotted lines, to the final burning surface 48a through 48e and 50a through 50e at web burnout. Without the slivers 16a through 16e the propellant remaining will continue to burn, and the rocket engine will continue to function at a reduced level of thrust. Referring particularly to star-point 42a, the configuration of the outer ends 40 of the grooves adjacent to star-point 42a are such as to provide at the base of star-point 42a a pair of surfaces 54a and 56a that are substantially parallel to one another. Star-point 42a is further defined by the converging surfaces 58a and 60a, which form walls of the adjacent grooves 38, and by rounded tip 62a which confronts the central passage 22. The star-points 42b through 42e are defined by surfaces similar to surfaces 54a, 56a, 58a, 60a, and 62a of star-points 42a.

In FIGURE 3 is seen a perspective view of one of the slivers 16 shown in FIGURE 2. The curved triangular sliver 16 is defined by the convex base 46, which is bonded to the casing 12, as shown in FIGURE 2, and the concave surfaces 48, 50 which are parts of the final burning surface of the propellant 14 at the center of the base of the star-points 42 when the portions of the web between the radial grooves 38 and the peripheral web 44 have burned through simultaneously, as indicated in FIGURE 2. The slivers are terminated by end surfaces 18, 20 perpendicular to the base 46.

Since many embodiments of the present invention may be made and since many changes may be made in the specific embodiments described herein without departing from the spirit of the invention, the foregoing description is to be interpreted as illustrative only and not in a limiting sense.

I claim:

1. A rocket engine comprising, in combination, a substantially cylindrical casing having a hollow solid propellant charge cast therein, said charge comprising a circumferential web of propellant case-bonded to said casing and a plurality of star points extending radially from said web as a base toward a central longitudinal axis of said casing, a plurality of inert slivers of curved triangular cross-section located within and against said casing at the midpoints of the bases of said star points, a discharge nozzle, and an igniter.

2. A rocket engine comprising, in combination, a substantially cylindrical casing, a solid propellant charge cast therein in the form of a peripheral web case-bonded to said casing and having a plurality of extensions extending from said web as a base radially toward a central longitudinal axis of said casing, a plurality of inert slivers extending longitudinally through said peripheral web of said propellant charge within and against said casing substantially along center lines through the bases of said extensions therefrom, a central cavity within said propellant charge, a discharge nozzle, and an igniter.

3. A rocket engine according to claim 2 wherein said inert slivers have a cross-section congruent with the cross-section of those portions of solid propellant ordinarily remaining unburned at the time that the peripheral web has burned through to said motor casing in those portions of said web between said extensions.

4. A rocket engine according to claim 1 and wherein said inert slivers are made of a material, the apparent density of which is less than polysulfide propellants.

5. A rocket engine according to claim 1 and wherein said inert slivers are made of a composition having an apparent density less than that of polyurethane propellants.

6. A rocket engine according to claim 1 and wherein said inert slivers are made of a composition having an apparent density less than that of polybutadiene-acrylic acid propellant.

7. A rocket engine according to claim 1 and wherein said inert slivers are made of aluminum.

References Cited in the file of this patent

UNITED STATES PATENTS 2,816,418    Loedding _____ Dec. 17, 1957